(12) United States Patent
Blickle

(10) Patent No.: US 11,454,313 B2
(45) Date of Patent: Sep. 27, 2022

(54) GEARBOX WITH A HOUSING WHICH HAS A LOWER HOUSING PART, ONTO WHICH AN UPPER HOUSING PART IS PLACED

(71) Applicant: SEW-EURODRIVE GMBH & CO. KG, Bruchsal (DE)

(72) Inventor: Christopher Blickle, Greenville, SC (US)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 17/547,422

(22) Filed: Dec. 10, 2021

(65) Prior Publication Data

US 2022/0099174 A1 Mar. 31, 2022

Related U.S. Application Data

(63) Continuation of application No. 17/158,218, filed on Jan. 26, 2021, now Pat. No. 11,199,254, which is a
(Continued)

(30) Foreign Application Priority Data

Dec. 2, 2016 (DE) .......................... 102016014336.3

(51) Int. Cl.
*F16H 57/04* (2010.01)
*F16H 57/031* (2012.01)
*F16H 57/02* (2012.01)

(52) U.S. Cl.
CPC ....... *F16H 57/0416* (2013.01); *F16H 57/031* (2013.01); *F16H 2057/02008* (2013.01)

(58) Field of Classification Search
CPC ............................................ F16H 2057/02008
See application file for complete search history.

(56) References Cited

U.S. PATENT DOCUMENTS 2,511,479 A 6/1950 George
4,074,590 A 2/1978 Jorg
(Continued)

FOREIGN PATENT DOCUMENTS

DE 102004030180 A1 2/2006
FR 1330220 A * 6/1963 ........... F16H 57/037
(Continued)

OTHER PUBLICATIONS

International Search Report dated Mar. 9, 2018, in International Application No. PCT/EP2017/025343 (English anguage translation).

(Continued)

*Primary Examiner* — Vicky A Johnson
(74) *Attorney, Agent, or Firm* — Carter, DeLuca & Farrell LLP

(57) ABSTRACT

A gearbox includes a housing, which has a lower housing part onto which an upper housing part is placed. The lower housing part and the upper housing part are in physical contact along a contact surface, for example, so that the contact surface between the lower and upper housing part lies in a plane and/or is planar. Cooling fins are situated on the housing, the cooling fins having a curved characteristic such that a portion of an axially directed airflow streaming along the housing, and thus in particular an airflow that is streaming parallel to the axis of rotation of the input shaft, is deflected in a transverse direction between two cooling fins disposed closest to each other in the axial direction in each case, the axial direction, for example, being parallel to the contact surface, e.g., the plane.

20 Claims, 2 Drawing Sheets

Related U.S. Application Data continuation of application No. 16/466,237, filed as application No. PCT/EP2017/025343 on Nov. 23, 2017, now Pat. No. 10,900,558.

(56) References Cited

U.S. PATENT DOCUMENTS

| | | | |
|---|---|---|---|
| 4,630,945 A * | 12/1986 | Gerling | F16C 37/00 |
| | | | 165/47 |
| 5,012,861 A | 5/1991 | Krunze et al. | |
| 5,191,813 A * | 3/1993 | Havens | F16H 57/0483 |
| | | | 74/606 R |
| 6,422,786 B1 | 7/2002 | Grant | |
| 6,714,415 B1 * | 3/2004 | Shah | B21C 23/10 |
| | | | 257/722 |
| 8,555,747 B2 | 10/2013 | Kant | |
| 9,062,754 B2 * | 6/2015 | Strauβ et al. | F16H 57/0447 |
| 10,103,089 B2 * | 10/2018 | Kaslusky | H01L 23/467 |

FOREIGN PATENT DOCUMENTS

| | | |
|---|---|---|
| GB | 493698 A | 10/1938 |
| GB | 549619 A | 11/1942 |
| JP | 2011069457 A | 4/2011 |

OTHER PUBLICATIONS

International Preliminary Report on Patentability issued from the International Bureau dated Jun. 13, 2019.

\* cited by examiner

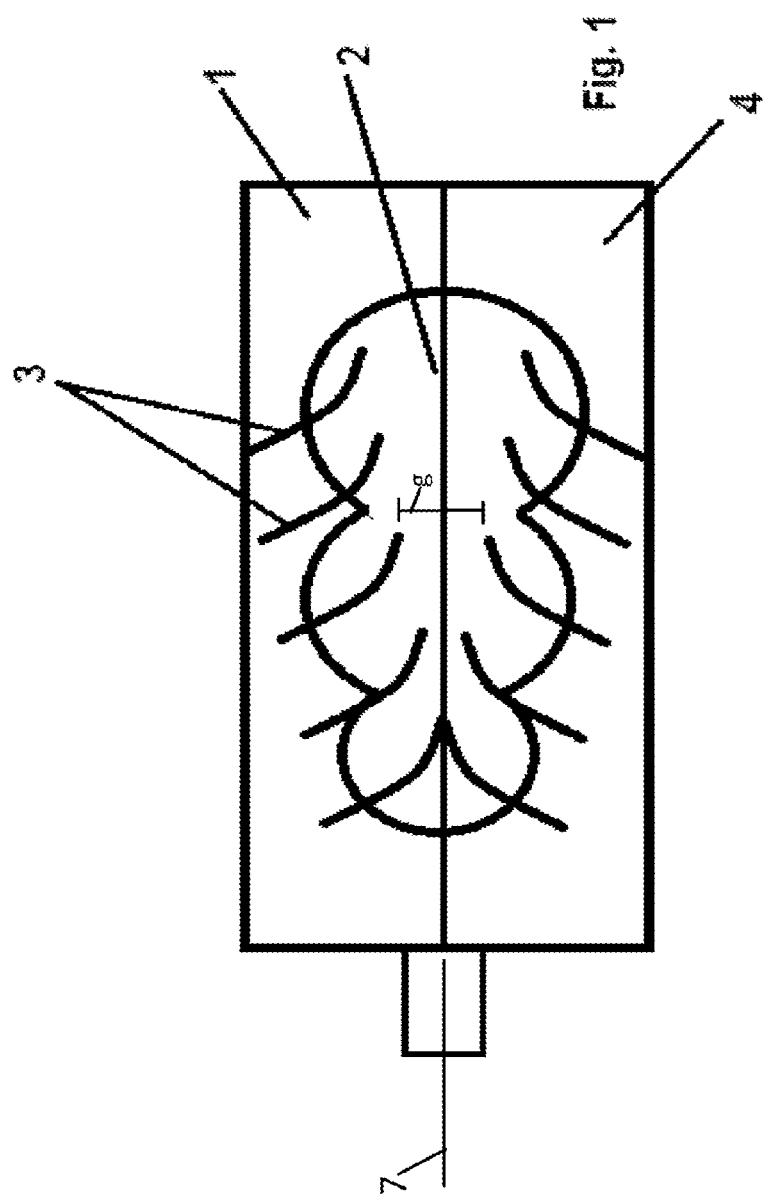

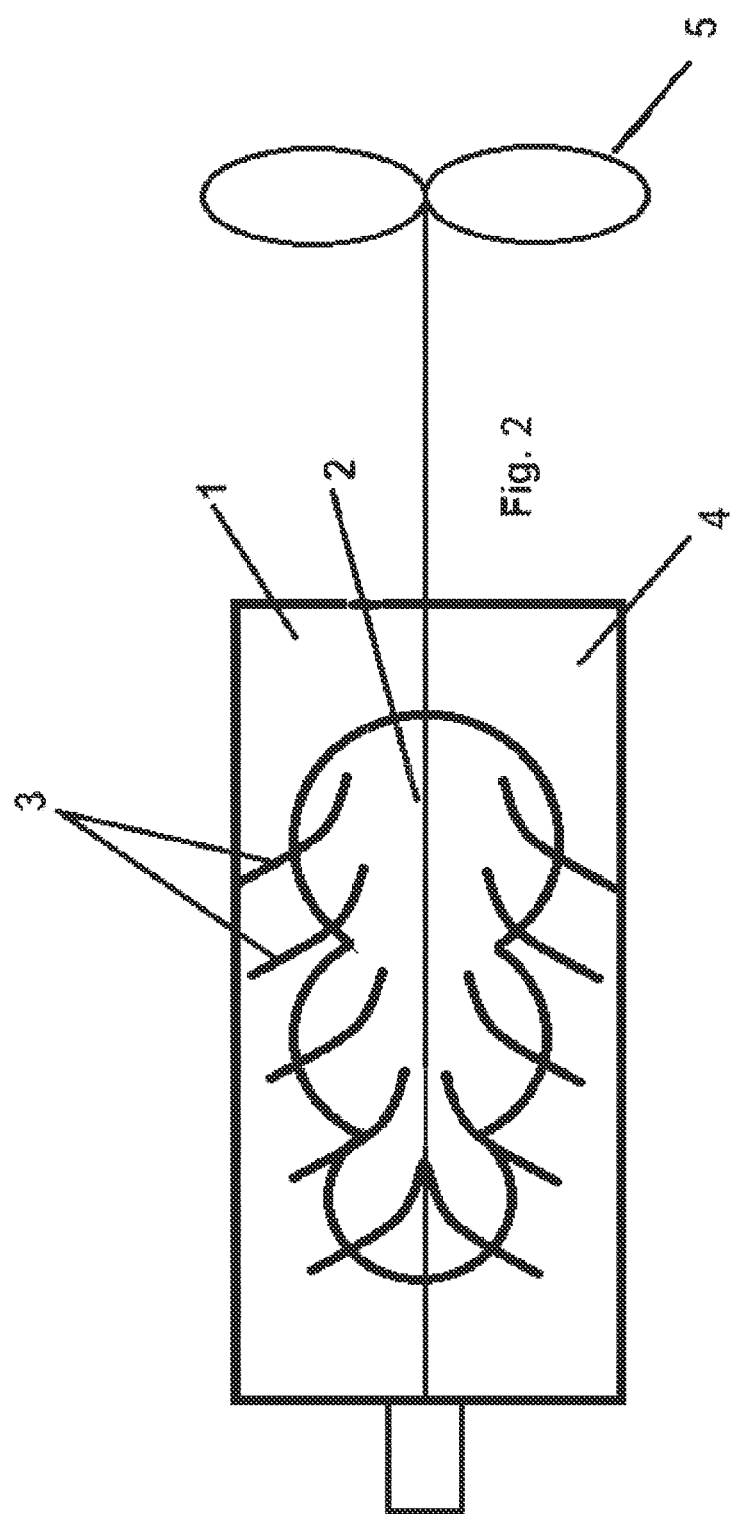

GEARBOX WITH A HOUSING WHICH HAS A LOWER HOUSING PART, ONTO WHICH AN UPPER HOUSING PART IS PLACED

CROSS-REFERENCE TO RELATED APPLICATIONS

The present application is a continuation of U.S. patent application Ser. No. 17/158,218, which is a continuation of U.S. patent application Ser. No. 16/466,237, filed on Jun. 3, 2019, now U.S. Pat. No. 10,900,558, issued on Jan. 26, 2021, which is which is the national stage of PCT/EP2017/025343, having an international filing date of Nov. 23, 2017, and claims priority to Application No. 102016014336.3, filed in the Federal Republic of Germany on Dec. 2, 2016, each of which is expressly incorporated herein in its entirety by reference thereto.

FIELD OF THE INVENTION

The present invention relates to a gearbox having a housing which has a lower housing part onto which an upper housing part is placed.

BACKGROUND INFORMATION

Certain conventional gearboxes include a housing, which accommodates bearings for the rotatable support of shafts.

SUMMARY

According to an example embodiment of the present invention, a gearbox includes a housing having a lower housing part onto which an upper housing part is placed, a lower housing part and an upper housing part are in physical contact along a contact surface, in particular so that the contact area between the lower and upper housing part is located in a plane and/or is planar, wherein cooling fins are situated on the housing, which are provided in curved form such that a portion of an axially directed airflow streaming along the housing, and thus in particular an airflow streaming parallel to the axis of rotation of the input shaft, is deflected in a transverse direction between two cooling fins situated closest to each other in the axial direction in each case, the cooling fins situated above the contact surface in particular deflecting the respective portion of the airflow in the transverse direction, in particular in the vertical direction, and the cooling fins situated below the contact surface deflecting the respectively allocated portion in a direction opposite to the transverse direction, the axial direction in particular extending parallel to the contact surface, in particular the plane.

The upper housing part need not be situated on top in the gravitational direction, i.e. above the lower housing part, but the gearbox may be arranged in any desired alignment.

Therefore, the upper housing part should be understood as a first housing part, and the lower part as a second housing part. 'Above' then means on the particular side of the contact surface on which the first housing part is situated, or in other words, above the space region that faces away from the second housing part. 'Below' thus means in the space region of the contact surface that faces away from the first housing part.

This offers the advantage that the cooling fins, which are situated one behind the other in the axial direction, trap and deflect multiple portions of the airflow, so that a more uniform heat dissipation of the gearbox is possible.

In example embodiments, the initial distance of the cooling fins monotonically decreases in the axial direction, in particular in proportion to the axial position, or more progressively, the initial distance of the respective cooling fin being the smallest distance to the contact surface in each case, the axial position in particular being the distance to the axial end region of the gearbox disposed counter to the axial direction. This has the advantage that the cooling fins that are disposed at a greater distance in the direction of the airflow start closer to the contact surface, that is to say, at a smaller initial distance. A monotonic decrease in the initial distances has the effect that the between two closest to each other is always an equally wide portion of the airflow, and thereby makes it possible to achieve a uniform distribution of the airflow.

In example embodiments, the initial distance of the cooling fins in the axial direction is inversely proportional to the axial position. This offers the advantage that the initial distance progressively decreases with increasing distance from the fan which is driving the airflow, so that a virtually constant volumetric flow is able to be conveyed between two cooling fins situated closest to each other in each case.

In example embodiments, a fan is situated on the gearbox, in particular a fan which is connected in a torsionally fixed manner to the input shaft, the fan induces the axially directed airflow along the housing, the quotient of a first difference and a second difference is proportional to the quotient of a second velocity to a first velocity, the first difference is the difference amount of the initial distances of two cooling fins situated closest to each other in the axial direction in each case, and the airflow has the first velocity, i.e. flow velocity, when the airflow enters between the cooling fins, and the second difference is the difference amount of the initial distances of two further cooling fins situated closest to each other in the axial direction in each case, and the airflow has the first velocity, i.e. flow velocity, when the airflow enters between these further cooling fins. This offers the advantage that a uniform distribution of the airflow is achievable because an identical portion is conveyed in each case between two cooling fins situated closest to each other. This makes it possible to achieve a substantially uniform heat dissipation from the gearbox.

In example embodiments, the lower housing part resembles the upper housing part. This offers the advantage that a multitude of gearboxes may be produced using a low number of parts.

In example embodiments, a first number of cooling fins is situated above the contact surface, and the remaining cooling fins are situated below the contact surface, the first number in particular being equal to the number of the remaining cooling fins. This offers the advantage that the gearbox is cooled in a symmetrical, i.e. uniform, manner.

In example embodiments, the cooling fins are arranged in two pieces or in multiple pieces, and a respective first piece is provided on one of the two housing parts, and a respective further piece is provided on a bearing cover, an air gap, in particular, being situated between the respective first piece and the respective further piece. This is considered advantageous insofar as the bearings are able to be covered by a bearing cover while a uniform heat dissipation is achievable nevertheless.

In example embodiments, the curved characteristic of the cooling fins situated above the contact surface is provided in mirror symmetry with the curved characteristic of the cooling fins situated underneath the contact surface in relation to the contact surface. This has the advantage of allowing for a simpler production.

In example embodiments, the contact surface is planar, that is to say, encompassed by a plane, in particular. This offers the advantage that uncomplicated sealing may be implemented between the upper and the lower housing part.

In example embodiments, the cooling fins situated on the housing are positioned and curved such a way that the same volumetric airflow is conveyed between two cooling fins situated closest to each other in the axial direction in each case, or in other words, the distance in the axial direction between the two cooling fins situated closest to each other in the axial direction increases with an axially greater position, in particular in accordance with or in proportion to the inflow velocity of the airflow into the region between two respective cooling fins. This has the advantage of achieving the most uniform heat dissipation possible.

Further features and aspects of example embodiments of the present invention are described in greater detail below with reference to the appended Figures.

BRIEF DESCRIPTION OF THE DRAWINGS

FIG. 1 shows a gearbox whose housing includes a lower housing part 4 and an upper housing part 1, which is placed on top.

FIG. 2 shows a gearbox including a fan 5.

DETAILED DESCRIPTION

As illustrated in FIG. 1, the two housing parts 1 and 4 have the same design, i.e. the same configuration.

The two housing parts 1 and 4 include bearing seats in each case, which are able to accommodate bearings for the support of an input shaft, an output shaft, and two intermediate shafts, two toothed components being connected to the intermediate shafts in a torsionally fixed manner, and only one toothed component in each case being connected to the input shaft and to the output shaft.

As illustrated in FIG. 1, the input gear stage is arranged as a right-angle gear stage and is driving two parallel shaft gear stages so that the two intermediate shafts and the output shaft including their bearings are covered by bearing cover 2 on the side.

The interior space of the gearbox is filled with lubricating oil, so that the tooth systems that are in engagement with one another are lubricated by lubricating oil.

Cooling fins 3 for the dissipation of heat are provided, which are composed of a plurality of parts. Each cooling fin 3 includes at least two parts. A first part of the respective cooling fin 3 is situated on bearing cover 2 and a second part is situated on the respective housing part 1 or 4.

Upper housing part 1 is connected to the lower housing part 4 along a contact surface, in particular a contact plane.

Each cooling fin has a curved characteristic starting at the contact surface, so that an incoming airflow that streams along the contact plane in the axial direction, i.e. parallel to the direction of the axis of rotation of the input shaft z, and along the housing of the gearbox, is deflected in an upward or downward direction The curved characteristic of the respective cooling fins 3 begins at an initial distance from the contact surface and ends at a greater final distance. The distance from the contact surface increases monotonically along cooling fin 3. For example, the characteristic of cooling fins 3 is such that the gradient also increases monotonically with the distance from the contact surface.

The wall thickness of the respective cooling fin 3 may be substantially constant. An air gap g is provided between the region of the respective cooling fin 3 situated on bearing cover 2 and/or provided thereon, and the region of respective cooling fin 3 situated on the upper or lower housing part (1, 4). This air gap g may be configured to be as small as possible.

The values of the respective initial distances of cooling fins 3 decrease monotonically in the axial direction, the initial distance of the final cooling fin 3 even vanishing, in particular so that final cooling fin 3 of upper housing part 1 and final cooling fin 3 of lower housing part 4 come very close to each other or even touch.

As illustrated in FIG. 2, it is also possible to provide a fan whose airflow streams along the outer sides of the gearbox in the axial direction. Because of curved cooling fins 3, a respective portion of the conveyed airflow is deflected in the transverse direction, the cooling fins 3 of upper housing part 1 deflecting the respective portion in an upward direction, and cooling fins 3 of lower housing part 1 deflecting the respective portion in a downward direction.

In the example embodiment illustrated in FIG. 1 and FIG. 2, the initial distance of cooling fins 3 in the axial direction decreases in proportion to the axial distance from the end face of the gearbox. In the exemplary embodiment according to FIG. 2, the end face of the gearbox is the side of the gearbox that is facing the fan. Because of the proportional dependence on the axial distance, a portion of the airflow which always has the same width is deflected between two cooling fins 3 of the respective housing part (1, 4) that are closest to each other in each case.

In further exemplary embodiments, the initial distance of cooling fins 3 has a dependence on the axial direction according to a function of a higher order, in particular according to a square function. The portion of the airflow deflected between two cooling fins 3 of respective housing part 1 or 4 closest to each other therefore has a width that increases with the axial distance when viewed in the transverse direction to the axial direction. However, since the flow velocity of the respective deflected portion decreases with increasing axial distance, the deflected volumetric airflow, as the respective deflected volume per time, is as constant as possible.

In this manner, the most uniform distribution possible of the cooling output is achievable on the particular side surface of the gearbox along which the airflow is streaming.

In further exemplary embodiments, fan 5 is disposed on the input shaft in a torsionally fixed manner and therefore conveys the airflow counter to the axial direction. Similar to the afore-described example embodiment, the initial distances of the cooling fins thus decrease counter to the axial direction in proportion to an increasing axial distance from the input shaft, in particular from the bearing of the input shaft, or progressively such that the portion of the airflow, particularly conveyed by the fan, deflected between two cooling fins 3 in each case induces an identical volumetric flow.

In order to ensure that the volumetric flow is immediately identical in two different portions, the differences of the initial distances of adjacent cooling fins 3 may exhibit an inversely proportional behavior to the velocities of the airflow exhibited by the airflow when it is streaming into the intermediate regions between the two adjacent cooling fins in each case. The following therefore applies:

$$Da1/Da2 = v2/v1$$

where Da1 is the difference amount of the two initial distances of two cooling fins 3 situated closest to each other in the flow direction, and Da2 is the difference amount of the two initial distances of two cooling fins 3 situated closest to each other in the flow direction, which are, for example, set apart from cooling fins 3 allocated to Da1 in the flow direction, v1 being the flow velocity of the airflow in the inflow region between cooling fins 3 allocated to the two Da1, and v2 being the flow velocity of the airflow in the inflow region between cooling fins 3 allocated to the two Da2.

The curved characteristic of cooling fins 3 has a gradient that increases in the flow direction so that the gradient, which initially has a virtually parallel orientation with respect to the flow direction, gradually increases, or in other words, inclines more and more, in the transverse direction.

In further exemplary embodiments, further cooling fins are provided in addition. These further cooling fins may be situated outside the region of cooling fins 3, i.e. they are not situated between two cooling fins 3 in each case.

In further exemplary embodiments, the gearbox is aligned in a different orientation. The upper housing part need not be situated on top in the gravitational direction, i.e. above the lower housing part, but the gearbox may be arranged in any desired alignment. Therefore, the upper housing part should be understood as a first housing part, and the lower part as a second housing part. 'Above' then means on the particular side of the contact surface on which the first housing part is situated, or in other words, the space region that faces away from the second housing part. 'Below' thus means in the space region of the contact surface that faces away from the first housing part.

Thus, according to an example embodiment of the present invention, a gearbox includes a housing, having a lower housing part 4 onto which an upper housing part 1 is placed, e.g., connected by screws 6. The lower housing part 4 and the upper housing part 1 are in physical contact along a contact surface, e.g., so that the contact surface between the lower housing part 4 and upper housing part 1 lies in a plane and/or is planar. Cooling fins 3 are situated on the housing, which have a curved characteristic such that a portion of an axially directed airflow streaming along the housing, and thus in particular an airflow streaming parallel to the axis of rotation of the input shaft, is deflected in a respective transverse direction between two cooling fins 3 situated closest to each other in the axial direction in each case, e.g., the cooling fins 3 situated above the contact surface deflecting the respective portion of the airflow in the transverse direction, e.g., in the vertical direction, and the cooling fins 3 situated below the contact surface deflecting the respectively allocated portion in a direction that is opposite to the transverse direction, the axial direction in particular being parallel to the contact surface, especially the plane.

LIST OF REFERENCE CHARACTERS 1 upper housing part
2 bearing cover
3 cooling fin
4 lower housing part
5 fan
7 axis of rotation of input shaft
g air gap

What is claimed is:
1. A gearbox, comprising:
    a housing, including a first housing part and a second housing part, the first housing part and the second housing part being connected and in physical contact along a contact surface;
    wherein the housing includes cooling fins adapted to deflect at least a portion of an airflow streaming in an axial direction parallel to the contact surface along the housing and/or an airflow streaming parallel to an axis of rotation of an input shaft in a direction transverse to the axial direction and/or the axis of rotation of the input shaft;
    wherein the cooling fins extend in a direction away from the contact surface; and
    wherein an initial distance of the cooling fins decreases in the axial direction, the initial distance corresponding to a smallest distance of the cooling fin from the contact surface.

2. The gearbox according to claim 1, wherein the initial distance of the cooling fins decreases monotonically in the axial direction.

3. The gearbox according to claim 1, wherein the initial distance of the cooling fins decreases non-monotonically in the axial direction.

4. The gearbox according to claim 1, wherein the initial distance of the cooling fins decreases progressively in the axial direction.

5. The gearbox according to claim 1, wherein the cooling fins are curved.

6. The gearbox according to claim 1, wherein the cooling fins are provided on the first housing part and the second housing part.

7. The gearbox according to claim 1, wherein the cooling fins are arranged on the first housing part and the second housing part and extend symmetrically away from the contact surface.

8. The gearbox according to claim 1, wherein the contact surface is planar.

9. The gearbox according to claim 8, wherein the axial direction is parallel to the planar contact surface.

10. The gearbox according to claim 1, further comprising a fan provided on the gearbox and adapted to induce an axially-directed airflow along the housing.

11. The gearbox according to claim 1, wherein a first one of the cooling fins located on the first housing part and a second one of the cooling fins located on the second housing part contact each other.

12. The gearbox according to claim 11, wherein the first one of the cooling fins and the second one of the cooling fins contact each other at the contact surface.

13. The gearbox according to claim 1, wherein the first housing part and the second housing part are identical housing parts.

14. The gearbox according to claim 1, wherein the housing includes a bearing cover, at least one of the cooling fins including a first part arranged on the bearing cover.

15. The gearbox according to claim 1, wherein the housing includes a bearing cover, at least one of the cooling fins including a first part arranged on the bearing cover and a second part not arranged on the bearing cover.

16. The gearbox according to claim 1, wherein the contact surface corresponds to a center line of the housing.

17. The gearbox according to claim 1, wherein the cooling fins are adapted to convey a substantially constant volumetric flow between each pair of adjacent cooling fins.

18. The gearbox according to claim 1, wherein a wall thickness of each cooling fin is substantially constant.

19. The gearbox according to claim 1, wherein an air gap is located between a first one of the cooling fins arranged on the first housing part and a second one of the cooling fins arranged on the second housing part.

20. The gearbox according to claim 1, wherein a first subset of cooling fins is arranged on the first housing part and a second subset of cooling fins is arranged on the second housing part, an air gap being located between each opposed pair of cooling fins of the first subset of cooling fins and the second subset of cooling fins.

\* \* \* \* \*